United States Patent
Wineland (12) 
(10) Patent No.: US 12,214,637 B2
(45) Date of Patent: Feb. 4, 2025

(54) SPACER ELEMENT SYSTEM FOR AN AUTOMOTIVE SUSPENSION SYSTEM

(71) Applicant: Bradford John Wineland, Fountain Valley, CA (US)

(72) Inventor: Bradford John Wineland, Fountain Valley, CA (US)

( * ) Notice: Subject to any disclaimer, the term of this patent is extended or adjusted under 35 U.S.C. 154(b) by 408 days.

(21) Appl. No.: 17/750,958

(22) Filed: May 23, 2022

(65) Prior Publication Data

US 2022/0371390 A1 Nov. 24, 2022

Related U.S. Application Data (60) Provisional application No. 63/191,574, filed on May 21, 2021.

(51) Int. Cl.
*B60G 11/10* (2006.01)

(52) U.S. Cl.
CPC ...... *B60G 11/10* (2013.01); *B60G 2204/4402* (2013.01)

(58) Field of Classification Search
CPC ............ B60G 11/10; B60G 11/04; B60G 2204/4402; B60G 11/465; B60G 17/0275; B60G 2204/126; B60G 2206/911; F16F 1/22; F16F 1/26
See application file for complete search history.

(56) References Cited

U.S. PATENT DOCUMENTS

| | | | | |
|---|---|---|---|---|
| 4,553,773 A * | 11/1985 | Pierce | ...................... | B60G 5/04 280/DIG. 1 |
| 5,265,907 A | 11/1993 | Tostado | | |
| 6,945,548 B2 * | 9/2005 | Dudding | .................. | B60G 9/00 267/66 |
| 7,328,887 B2 * | 2/2008 | Leonard | ................ | B60G 11/28 280/124.157 |
| 7,537,219 B1 | 5/2009 | Sherwood | | |
| 8,602,429 B2 | 12/2013 | Nguyen | | |
| 8,827,289 B2 * | 9/2014 | Dilworth | ............... | B60G 11/113 280/124.111 |
| 9,114,685 B2 * | 8/2015 | Wilson | .................. | B60G 11/113 |
| 10,252,593 B2 | 4/2019 | Fida | | |
| 2007/0200312 A1 * | 8/2007 | Chamberlin | .......... | B60G 9/003 280/124.157 |
| 2010/0133763 A1 | 6/2010 | Carlson et al. | | |

FOREIGN PATENT DOCUMENTS

CN 210881575 U 6/2020

* cited by examiner

*Primary Examiner* — Pamela Rodriguez
(74) *Attorney, Agent, or Firm* — Renner, Otto, Boisselle & Sklar, LLP (57) ABSTRACT

A spacer element system for a vehicle suspension system, includes a receiver configured to be attached to a suspension component of the vehicle suspension system, and a spacer that is removably connected to the receiver. A vehicle suspension system includes a spring and the spacer element system, wherein the receiver is attached to the spring.

19 Claims, 9 Drawing Sheets

SPACER ELEMENT SYSTEM FOR AN AUTOMOTIVE SUSPENSION SYSTEM

RELATED APPLICATION DATA

This application claims the benefit of U.S. Provisional Application No. 63/191,574, filed May 21, 2021, the disclosure of which is incorporated herein by reference in its entirety.

TECHNICAL FIELD

The present disclosure relates generally to a spacer element system, and more specifically to a spacer element system for a vehicle suspension system.

BACKGROUND

Vehicle suspension systems connect a vehicle's chassis to its wheels and are designed to absorb energy from the wheels when the vehicle is in motion. Suspension systems are designed to support road holding and handling by keeping the wheels in contact with the ground as much as possible. Typical suspension components include springs for absorbing impacts from the driving surface, shock absorbers for damping spring action to reduce bouncing, and rods and linkages for connecting the suspension components to each other, the vehicle frame, and the wheels. A suspension system's spring rate (e.g., the amount of force needed to compress the spring), is typically provided at a specific desired rate to provide desirable handling and ride performance for a given application. Suspension travel (e.g., the distance that the suspension allows the wheel to travel) is also typically set in accordance with the spring rate. In some examples, a soft suspension may designed to have a long suspension travel. This type of suspension may be suitable for off road applications. In other examples, a stiff suspension may be designed to have a shorter suspension travel. This type of suspension may be suitable for heavy load towing or hauling applications. Most vehicle manufacturers design their vehicle suspension systems with spring rates and travel for general purpose, everyday type driving situations (e.g., paved and dirt road applications, light towing or hauling, etc.). However, this type of suspension design is often not suitable for various specific uses. Suspension systems designed for typical daily driving situations are often inadequate when hauling heavy loads, towing a heavy trailer, or driving offroad. For example, additional weight from towing or hauling can cause vehicle sag or squat where the rear of the vehicle rides lower than normal. In another example in which a vehicle drives offroad, bumps, holes, and other rough terrain can cause a rough vehicle ride (even to the extent where the wheels lose contact with the ground) instead of the suspension absorbing the energy, and can also cause a suspension to "bottom out" (i.e., exceed the suspension travel limit).

The shortcomings of conventional vehicle suspension systems are further amplified in situations where a vehicle suspension is specifically designed for specific application. For example, a suspension designed for off-roading applications is not suitable for heavy load towing or hauling. Similarly, a suspension designed for heavy load towing. These specific application suspension systems are also in many instances not even appropriate for general purpose, every day driving. The vehicle may have too stiff or too soft of a ride for daily driving.

Accordingly, there remains a need for improvement in this technology area.

SUMMARY OF THE INVENTION

This application relates to a spacer element system for a vehicle suspension system. The spacer element system allows for a vehicle suspension system to be quickly and simply adjusted according to the anticipated driving and road conditions to provide the desired suspension performance for those conditions.

In accordance with an aspect of the present disclosure, a spacer element system for a vehicle suspension system includes: a receiver configured to be attached to a suspension component of the vehicle suspension system and a spacer that is removably connected to the receiver.

In some embodiments, the spacer element system may further include a spacer body, an impact surface on a side of the spacer body, and a connector on an opposite side of the spacer body from the impact surface, wherein the impact surface is configured to come into contact with a suspension modifier of the vehicle suspension system; and wherein the connector is configured to mate with a connector of the receiver.

In some embodiments, the spacer body possesses a predetermined height as measured from the impact surface to the connector.

In some embodiments, the connector comprises a pair of flanges extending inwardly from opposite sides of the spacer body and a pair of channels formed between each of the pair of flanges and the spacer body.

In some embodiments, the impact surface also includes an elevated rim set at least partially about the perimeter of the impact surface and having a tapered surface on an interior side.

In some embodiments, the impact surface is secured to the spacer body with a fastener.

In some embodiments, the impact surface and the spacer body are a unitary piece.

In some embodiments, the spacer also includes a fastener configured to lock the spacer into place relative to the receiver.

In some embodiments, the fastening mechanism is selected from a spring-biased latch, a spring-biased tab, and a spring-biased pin.

In some embodiments, the receiver further includes a base plate, a riser extending from a surface of the base plate, and a connector extending from a side of the riser opposite the base plate, wherein the connector is configured to engage with a connector of the spacer.

In some embodiments, the connector of the receiver possesses a shape that is complimentary to the connector of the spacer.

In some embodiments, the connector of the receiver comprises a slot for accepting a fastener of the spacer.

In some embodiments, the receiver further includes a leaf spring center pin shaft configured to correspond with and accept a leaf spring center pin of a leaf spring of the vehicle suspension system.

In some embodiments, the receiver is attached to the suspension system by one of a bolt, a clamp, and a weld In accordance with another aspect of the present disclosure, a vehicle suspension system includes a spring, and a spacer element system, the spacer element system including a receiver and a spacer, wherein the receiver is attached to the spring.

In accordance with another aspect of the present disclosure, a spacer element system for a vehicle suspension system includes a receiver configured to be attached to a suspension component of the vehicle suspension system, an impact surface, and an extender connecting the receiver to the impact surface, wherein the extender is configured to move the impact surface between a first position proximate to the receiver and a second position distal to the receiver at a predetermined distance.

In some embodiments, the extender is selected from a solenoid, a hydraulic piston, and a pneumatic piston.

In some embodiments, the extender may be configured to be remotely actuated.

In some embodiments, the impact surface further includes an elevated rim set at least partially about the perimeter of the impact surface and having a tapered surface on an interior side.

In accordance with another aspect of the present disclosure, a vehicle suspension system includes a spring, and a spacer element system, the spacer element system including a receiver, an impact surface, and an extender, wherein the receiver is attached to the spring.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Figure 1:
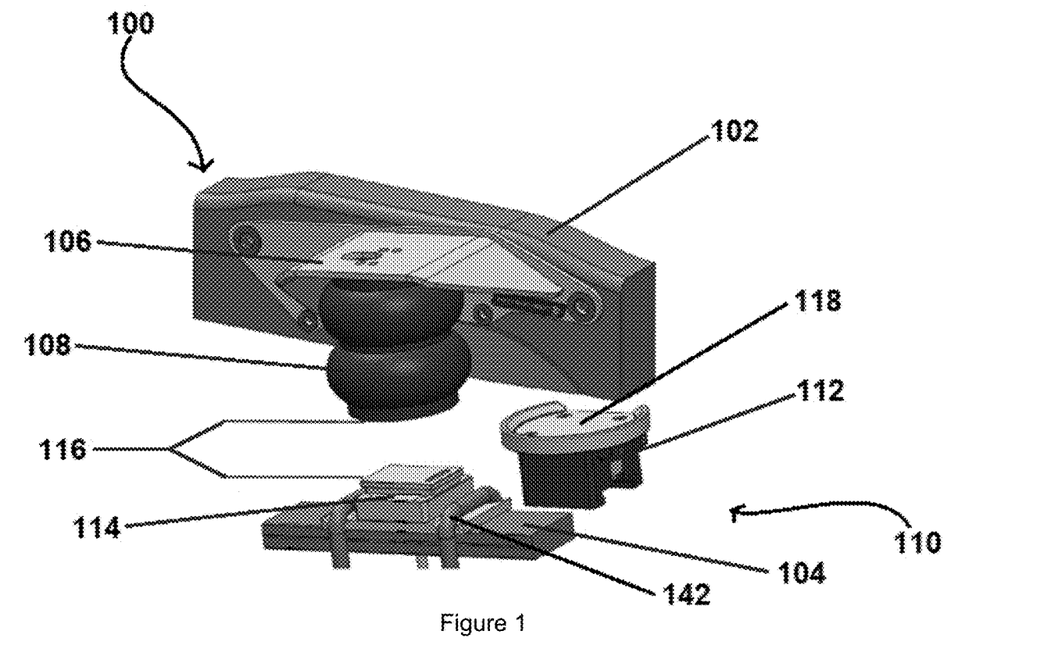
FIG. 1 is a schematic oblique view of a spacer element system according to an embodiment of the present application, the spacer element system shown in a vehicle environment in which the receiver is attached to a part of a vehicle suspension and the spacer is in a detached state.
Figure 2:
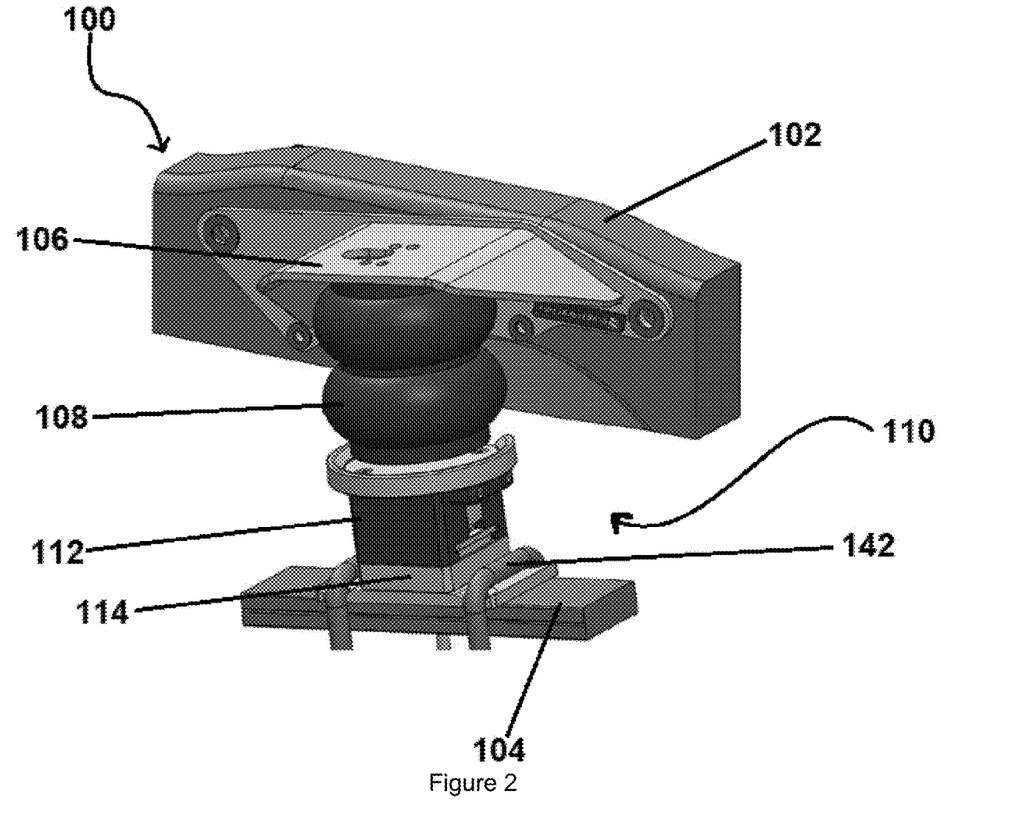
FIG. 2 is a schematic oblique view of the exemplary spacer element system of FIG. 1 with the spacer attached to the receiver.

Referring now to FIGS. 1 and 2, parts of an exemplary vehicle suspension system is shown at 100. The suspension includes a suspension spring 104 that may be attached to the vehicle chassis 102. In the exemplary embodiment shown, the suspension spring 104 is a leaf spring. The leaf spring may be attached at its ends to respective parts of the chassis (not shown). In other embodiments, the spring may be a coil spring. In such embodiments, the spring may be attached at one end to the axle or suspension arm, and attached at its other end to the chassis 102. In still other embodiments, the spring may be integrated as part of a strut assembly. The vehicle suspension system may include other components (not shown) such as at least one shock, at least one strut, at least one control arm, at least one sway bar, or any other components associated with the given type of suspension system. One or more brackets may also be provided for purposes of mounting the suspension component to the chassis, spring, axle, and/or control arm.

The vehicle suspension system 100 shown in FIGS. 1 and 2 include a bracket 106 mounted to the chassis 102. A suspension modifier 108 is attached to the bracket 106. The suspension modifier may be, for example, an air bag or bump stop. The suspension modifier 108 may operate to affect the spring rate and/or travel of the suspension.

The vehicle suspension system 100 shown in FIGS. 1 and 2 includes a spacer element system 110. The spacer element system 110 includes a spacer 112 and a receiver 114. The receiver 114 is attached to a component of the vehicle. In the exemplary embodiment shown, the receiver 114 is attached to the vehicle spring 104. In other embodiments, the receiver 114 may be attached to another part of the vehicle suspension system such as a control arm; or may be attached to the axle of the vehicle. The receiver may be attached and/or fastened to the suspension component or axle using one or more bolts, clamps, and welding. In the exemplary embodiment shown, u-bolts 142 fasten the receiver 114 to the vehicle spring 104. It will also be appreciated that in other embodiments, a bracket may be attached and/or fastened to a suspension component or axle, which may provide a mounting surface for the receiver. As installed, the receiver may be in line with the suspension modifier 108. As shown, there is a gap provided between the receiver and the suspension modifier 108. This gap 116 may be a given distance when the suspension is under load from the weight of the vehicle.

The spacer 112 may be removably attached to the receiver 114. FIG. 1 shows a state in which the spacer 112 is removed from the receiver 114. In this configuration the vehicle spring 104 is free to travel in the gap 116. This allows for more suspension travel, which may provide a softer suspension profile. FIG. 2 shows a state in which the spacer 112 is removed from the receiver 114. When the spacer 112 is attached to the receiver 114 as shown in FIG. 2, the gap 116 may be reduced or eliminated. This limits suspension travel and can result in a stiffer suspension profile.

As described below, the spacer 112 can be secured to and removed from the receiver engaging a fastening mechanism and sliding the spacer 112 into and out of place. In some embodiments, the gap provided between the spacer 112 and the suspension modifier 108 when the vehicle is under load allows for the spacer 112 to be installed and uninstalled without the need to lift the vehicle. In other embodiments, installation and removal of the spacer 112 may require that the vehicle be lifted.

Figure 3:
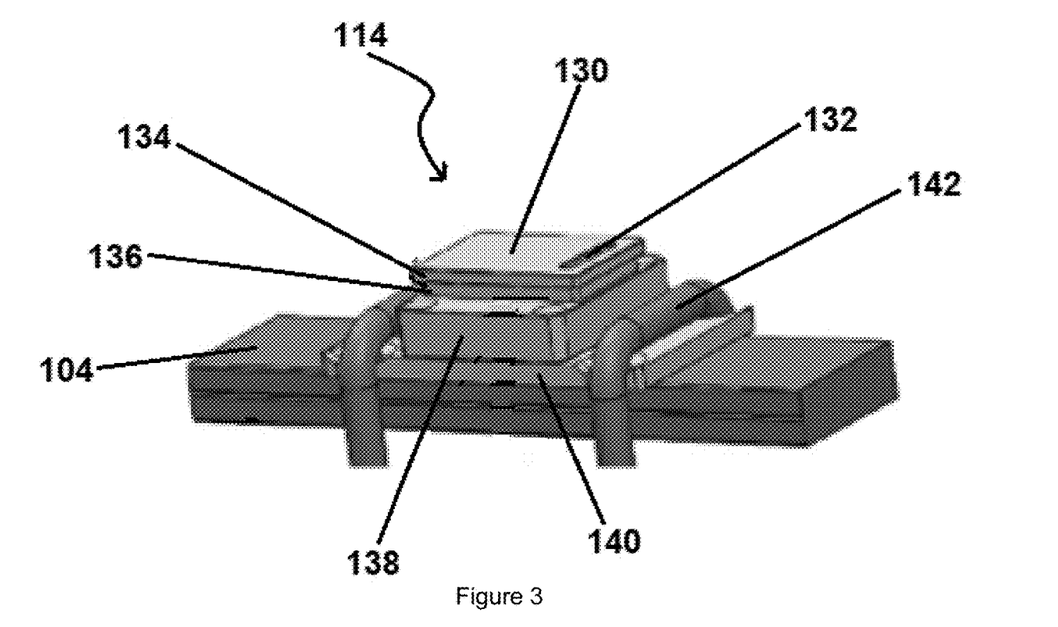
FIG. 3 is a schematic oblique view of the receiver.
Figure 5:
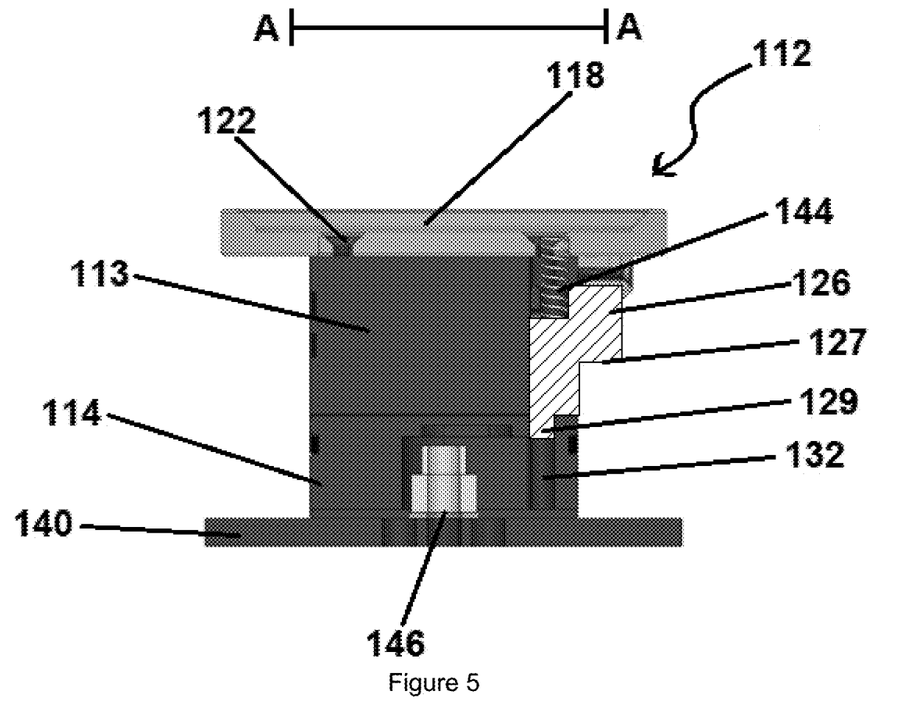
FIG. 5 is a schematic cross-sectional view of the spacer element system, the spacer attached to the receiver with the fastening mechanism of the spacer engaged with the receiver.
Figure 6:
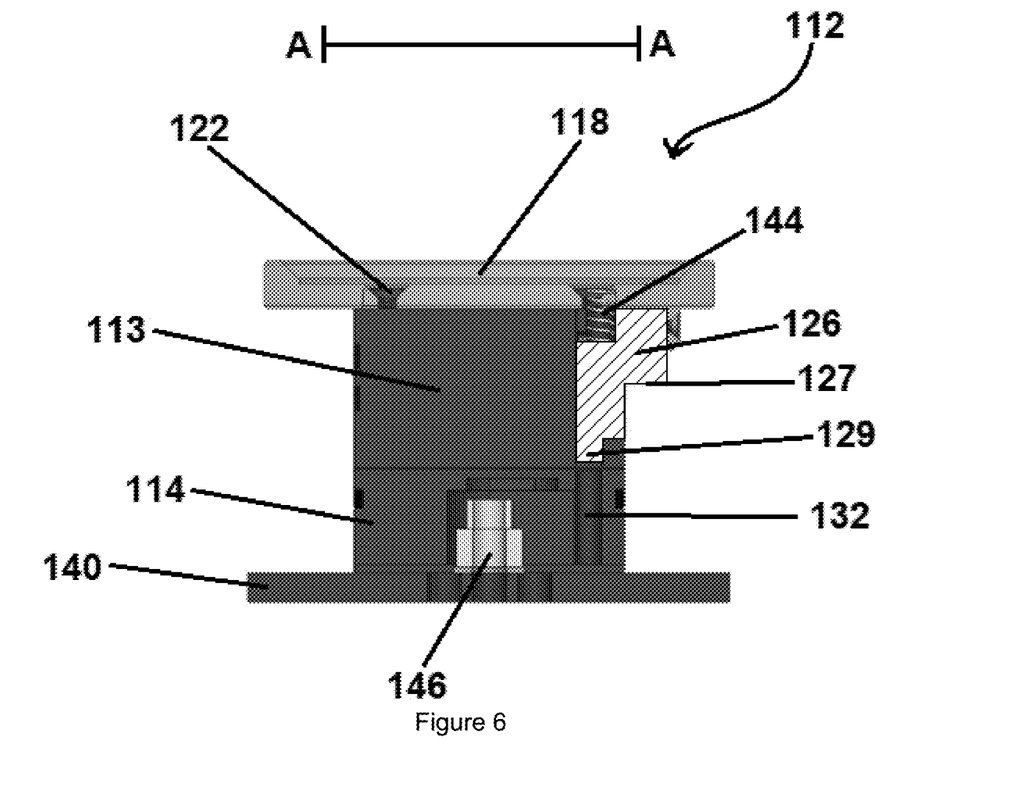
FIG. 6 is a schematic cross-sectional view the spacer element system, the spacer attached to the receiver with the fastening mechanism of the spacer disengaged with the receiver.

With additional reference to FIG. 3, the exemplary receiver 114 is shown. The receiver 114 includes a base plate 140. The base plate may be used to fasten the receiver 114 to the suspension component or axle of the vehicle. Features for accepting fasteners 142, and other components for securing the receiver 114 to the vehicle spring may be included on the base plate 140. In embodiments where the receiver is intended to be attached to a leaf spring, the receiver 114 can also include a leaf spring center pin shaft 146 as seen in FIGS. 5 and 6. The leaf spring center pin shaft 146 may allow the receiver 114 to be positioned directly over a leaf spring center pin of a vehicle suspension system 100. In yet other embodiments, the base plate 140 may be clamped or welded to the vehicle spring 104.

The receiver 114 includes a riser 138. The riser 138 may extend from a surface of the base plate 140 opposite the surface of the base plate 140 that is to be mounted to the suspension component, axle, or bracket. In the embodiment shown, as installed the riser 138 extends away from the vehicle spring 104. The receiver 114 includes a connector 130 at the side of the riser 138 distal the base plate 140. An exemplary riser 138 may have sufficient height so that the connector 130 is clear of the fasteners 142. In other words, the riser 138 may position the connector 130 so that the fasteners 142 do not interfere with the insertion and removal of the spacer 112. In some embodiments, two or all of the base plate 140, riser 138, and connector 130 are constructed as a unitary piece. Alternatively, two or all of the base plate 140, riser 138, and connector 130 can be fastened to one another with fasteners 122 such as screws and bolts.

Figure 4:
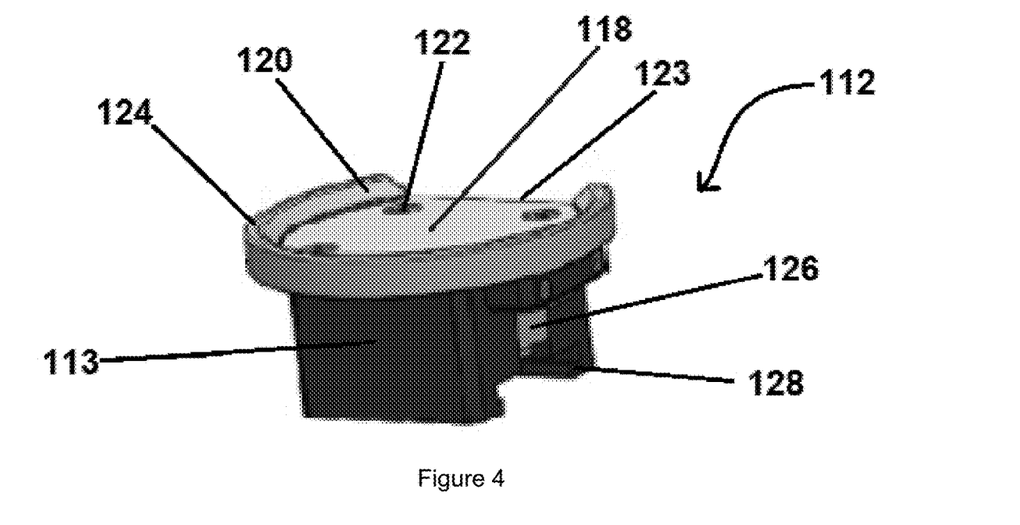
FIG. 4 is a schematic oblique view of the spacer.

The connector 130 is configured to engage and mate with a corresponding connector 128 of the spacer 112, shown in FIG. 4. In some embodiments, the connector 130 includes a tongue 134 that forms a groove 136 with the riser 138. As shown, the connector may also include a slot 132 at its top surface. The slot 132 may be configured to accept a fastening mechanism 126 of the spacer 112, also shown in FIG. 4. It will be appreciated that the connector 130 may also include additional features that allow the spacer 112 to be securely attached to the receiver 114.

With additional reference to FIG. 4, the exemplary spacer is shown at 112. The spacer 112 includes a spacer body 113. The height of the spacer body 113 may be predetermined to either substantially or completely fill the gap 116. The height may be selected to leave a small gap between the spacer 112 and the suspension modifier 108 when the suspension is under load from the weight of the vehicle, so that the spacer 112 can be inserted and removed without the need to lift the vehicle. In cases where the spacer body 113 height leaves no gap, a jack or other device may be used to create the clearance needed to insert and remove the device.

The spacer 112 includes an impact surface 118 on one side of the spacer body 113 as shown in FIG. 4. The impact surface may be part of a plate that is attached to the spacer body. In some embodiments, the spacer body 113 and the impact surface (plate) may be constructed as a unitary piece. In other embodiments, such as that shown in FIG. 4, the impact surface 118 may be secured to the spacer body 113 with fasteners 122 such as screws and bolts. The impact surface 118 may be shaped to correspond to the shape of a suspension modifier 108 attached to the vehicle suspension system 100. In an exemplary embodiment, an elevated rim 124 may be set at least partially about the perimeter of the impact surface 118. The elevated rim 124 may also include a tapered surface 120 on its interior side. Such features may ensure that the suspension modifier properly contacts the impact surface 118 and prevent damage to either component. In some embodiments, the impact surface 118 has a circular shape. In other embodiments, the impact surface 118 may have another appropriate shape. For example, the impact surface 118 shown in the figures has a semicircular shape. The straight side 123 of the impact surface 118 can prevent the spacer 112 from contacting the vehicle chassis 102 when the vehicle spring 104 and/or suspension modifier 108 become compressed. It will be appreciated that additional features and shape changes may be incorporated into the spacer 112 to ensure proper operation of the device.

The spacer 112 includes a fastener 126. The fastener 126 is configured mate with the slot 132 of the receiver 114 to lock the spacer 112 into place when inserted into the receiver. In an exemplary embodiment, the fastener 126 is maintained in position by a biasing element 144, such as a spring, arranged in the spacer body 113. The biasing element 144 may urge the fastener 126 into an extended (locked) position. As shown in FIGS. 5 and 6, the fastening mechanism 126 includes an extension 129 that can be inserted into the slot 132. FIG. 5 shows a state where the extension 129 has been urged into the slot 132 of the receiver 114 by the biasing element 144. In this position the spacer 112 may be securely held to the receiver 114. A user may press on a surface 127 to move the fastening mechanism 126 against the biasing element 144 to release the extension 129 and remove the spacer 112 from the receiver 114 as shown in FIG. 6.

Figure 7:
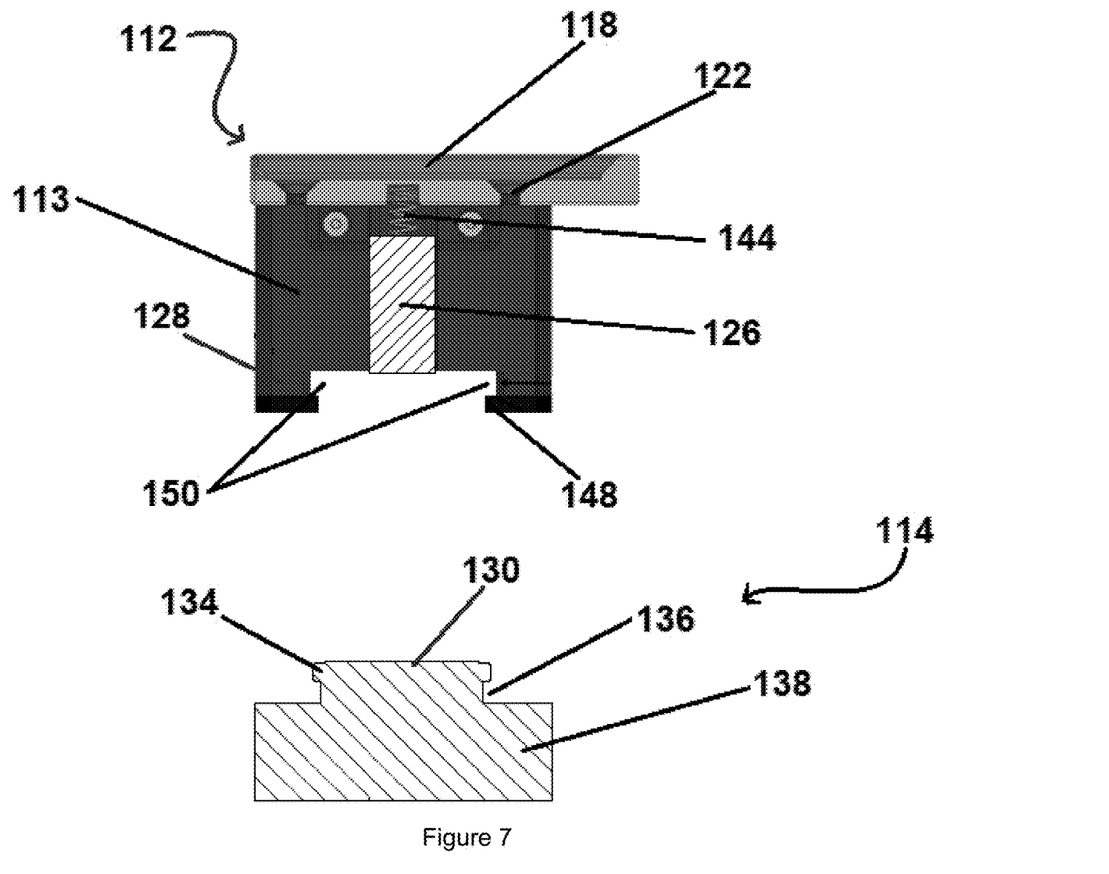
FIG. 7 is a schematic cross-sectional view of the spacer element system of FIGS. 5 and 6 along line A-A with the spacer separated from the receiver.
Figure 8:
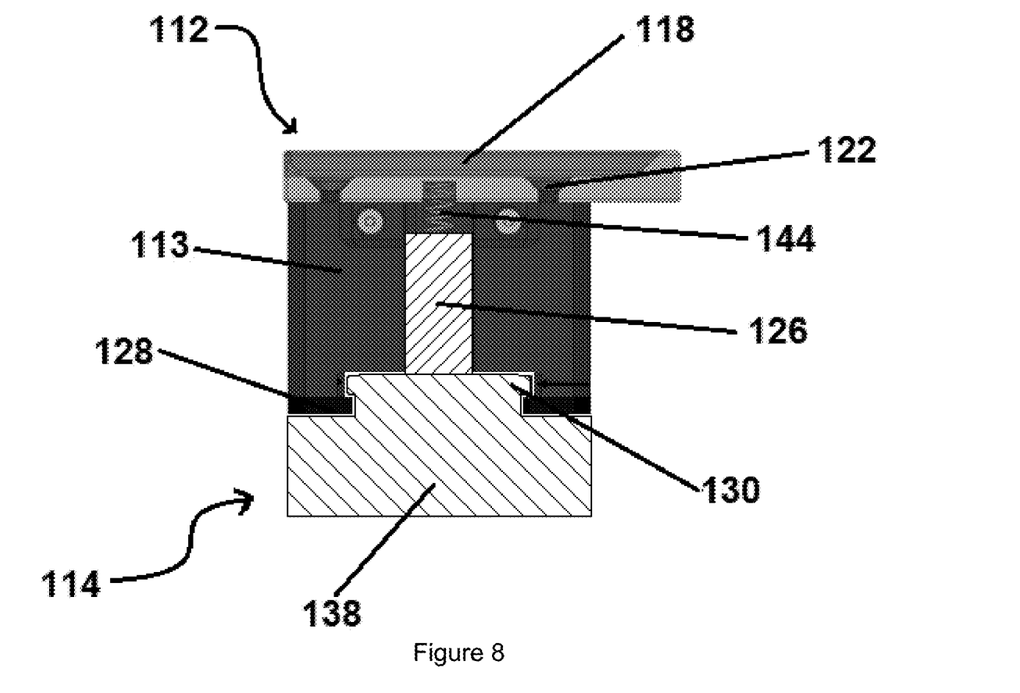
FIG. 8 is a schematic cross-sectional view of an exemplary spacer element system of FIGS. 5 and 6 along line A-A with the spacer attached to the receiver, the fastening mechanism of the spacer engaged with the receiver.

The spacer 112 includes a connector 128. With additional reference to FIGS. 7 and 8, the connector 128 is located on a side of the spacer body opposite of the impact surface 118. An exemplary embodiment of the connector 128 is shown in FIGS. 7 and 8. The connector 128 may include a flange 148 that defines channels 150. Likewise, a tongue 134 can define a groove 136 that gives the mating feature a shape that is complimentary to that of the channels 150. The spacer body 113 may be laterally slid onto the receiver 114 so that the connector 130 of the receiver is seated within the channels 150 as shown in FIG. 8. The complementary shapes of the connector 128 of the spacer and the connector 130 of the receiver may ensure proper placement of the spacer body 113. Additionally, the connectors 128, 130 may cooperate with the fastener 126 to secure the spacer body 113 in position and prevent inadvertent disconnection.

Figure 9:
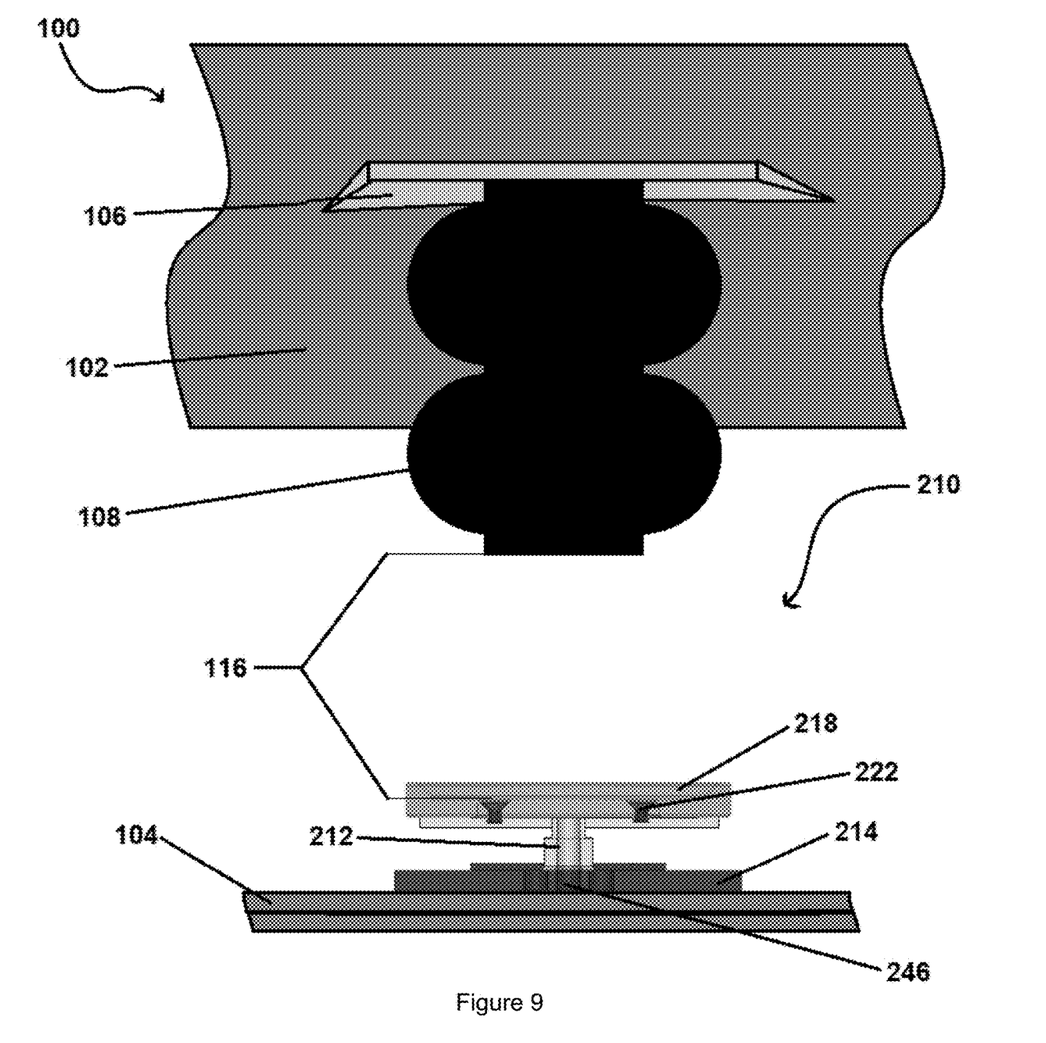
FIG. 9 is a schematic view of another spacer element system according to an embodiment of the present application, the spacer element system shown in a vehicle environment in which the receiver is attached to a part of a vehicle suspension and the spacer is in a first position.
Figure 10:
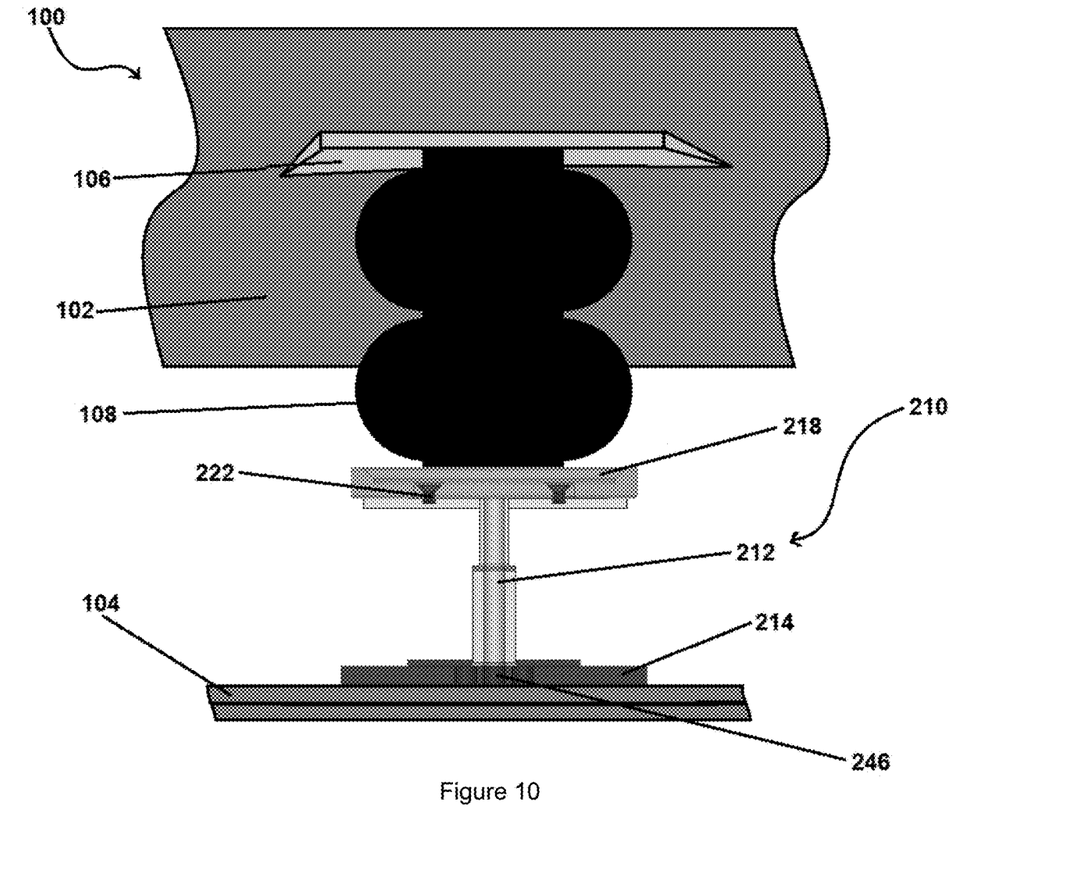
FIG. 10 is a schematic view of the exemplary spacer element system of FIG. 9 in which the spacer is in a second position.

With reference to FIGS. 9 and 10, another embodiment of depict another exemplary spacer element system 210. In this embodiment, the spacer element system 210 includes a receiver 214, an impact surface 218, and an extender 212. As with the previously described embodiment, the receiver 214 may be configured to be attached to a vehicle suspension system component, axle, or bracket. In the embodiment shown in FIGS. 9 and 10, the receiver 214 is attached to a vehicle spring 104. The connection may be established by any one of bolts, clamps, welding, and other suitable means. In embodiments where the receiver is to be connected to a leaf spring, the receiver 214 can also include a leaf spring center pin shaft 246. The leaf spring center pin shaft 246 may allow the receiver 214 to be positioned directly over a leaf spring center pin of a vehicle suspension system 100.

The suspension system components, bracket 106, and suspension modifier 108, including their materials, construction, and alternative arrangements, are described above, and will not be repeated of the sake of brevity.

An exemplary impact surface 218 may be secured to the extender with fasteners 222 such as screws and bolts. The impact surface 218 may be part of a plate that is attached to the extender. The impact surface 218 may further be shaped to correspond to the shape of a suspension modifier 108 attached to the vehicle suspension system 100. In an exemplary embodiment, the impact surface may include all or some of the features discussed above. As with the previously described embodiment, it will be appreciated that additional features and shape changes may be incorporated into the impact surface 218 to ensure proper operation of the device.

An exemplary extender 212 may be selected from a solenoid, a hydraulic piston, a pneumatic piston, a scissor lift, a lead screw, and any other mechanical device suitable for moving and maintaining the impact surface's 218 position relative to the receiver 214. A motor may drive the extender 212. In operation, the extender 212 may be configured to be set at a predetermined position. In some embodiments, the extender 212 can set the impact surface 218 between two positions, a retracted position (FIG. 9) and an extended position (FIG. 10). In other embodiments, the extender 212 can set the impact surface 218 to a position selected from more than two positions. For example, the extender can set the impact surface 218 at one or more intermediate positions between the retracted position and extended position. FIG. 9 shows an exemplary first position, where the impact surface 218 is proximate to the receiver. In this position the vehicle spring 104 is free to travel in the gap 116. This allows for more suspension travel, which may provide a softer suspension profile. FIG. 10 shows a state in which the impact surface is in the extended position. In this position the gap 116 may be reduced or eliminated. This limits suspension travel and can result in a stiffer suspension profile. In some embodiments, the extender 152 may be actuated, such as by a switch. The switch may be remotely located in any suitable location, such as in the vehicle's passenger compartment. The switch allows the position of the impact surface 118 to be changed without manual adjustment. In some embodiments, a power source is provided to the extender. Power may be provided from the vehicle.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A spacer element system for a vehicle suspension system of a vehicle, comprising:
 a receiver configured to be attached to a suspension component of the vehicle suspension system; and
 a spacer that is selectively removably connected to the receiver to constrain movement of the spacer relative to the receiver in first and second orthogonal axial directions,
 the spacer comprising:
 a joining mechanism moveable between a first position and a second position, wherein the joining mechanism is configured such that when in the first position, the spacer is removable from the receiver and when in the second position, the joining mechanism constrains movement of the spacer relative to the receiver in a third direct that is orthogonal to the first and second axial directions so as to secure the spacer to the receiver in the first, second, and third orthogonal directions.

2. The spacer element system of claim 1, wherein the spacer further comprises:
a spacer body;
an impact surface on a side of the spacer body; and
a connector on an opposite side of the spacer body from the impact surface;
wherein the impact surface is configured to come into contact with a suspension modifier of the vehicle suspension system; and
wherein the connector is configured to mate with a connector of the receiver.

3. The spacer element system of claim 2, wherein the spacer body possesses a predetermined height as measured from the impact surface to the connector of the spacer.

4. The spacer element system of claim 2, wherein the connector of the spacer comprises:
a pair of flanges extending inwardly from opposite sides of the spacer body; and
a pair of channels formed between each of the pair of flanges and the spacer body.

5. The spacer element system of claim 2, wherein the impact surface further comprises an elevated rim set at least partially about the perimeter of the impact surface and having a tapered surface on an interior side.

6. The spacer element system of claim 2, wherein the impact surface is secured to the spacer body with a fastener.

7. The spacer element system of claim 2, wherein the impact surface and spacer body are a unitary piece.

8. The spacer element system of claim 1, wherein the joining mechanism is selected from a spring-biased latch, a spring-biased tab, and a spring-biased pin.

9. The spacer element system of claim 1, wherein the receiver comprises:
a base plate;
a riser extending from a surface of the base plate; and
a connector extending from a side of the riser opposite the base plate; wherein the connector is configured to engage with a connector of the spacer.

10. The spacer element system of claim 9, wherein the connector of the receiver possesses a shape that is complimentary to the connector of the spacer.

11. The spacer element system of claim 9, wherein the connector of the receiver comprises a slot for accepting the joining mechanism of the spacer.

12. The spacer element system of claim 9, wherein the receiver is attached to the suspension component by at least one of a bolt, a clamp, and a weld.

13. A vehicle suspension system, comprising:
a spring; and
the spacer element system of claim 1, wherein the receiver is attached to the spring.

14. A spacer element system for a vehicle suspension system of a vehicle, comprising:
a receiver configured to be attached to a suspension component of the vehicle suspension system, the receiver comprising:
a base plate;
a riser extending from a surface of the base plate; and
a connector extending from a side of the riser opposite the base plate, the connector configured to engage with a connector of the spacer; and
a spacer that is removably connected to the receiver, wherein:
the receiver further comprises a leaf spring center pin shaft configured to correspond with and accept a leaf spring center pin of a leaf spring of the vehicle suspension system.

15. A spacer element system for a vehicle suspension system of a vehicle, comprising:
a receiver configured to be attached to a suspension component of the vehicle suspension system;
an impact surface; and
an extender connecting the receiver to the impact surface, the extender selectively moveable from a first position relative to the receiver to a second position relative to the receiver;
wherein the extender is configured to selectively move the impact surface to one or more intermediate positions between a retracted position proximate to the receiver when the extender is in the first position and an extended position distal to the receiver when the extender is in the second position.

16. The spacer element system of claim 15, wherein the extender is selected from a solenoid, a hydraulic piston, a pneumatic piston, a scissor lift, and a lead screw.

17. The spacer element system of claim 15, wherein the extender is configured to be remotely actuated.

18. The spacer element system of claim 15, wherein the impact surface further comprises an elevated rim set at least partially about the perimeter of the impact surface and having a tapered surface on an interior side.

19. A vehicle suspension system, comprising:
a spring; and
the spacer element system of claim 15, wherein the receiver is attached to the spring.

* * * * *